United States Patent
Lee

(10) Patent No.: US 9,195,847 B2
(45) Date of Patent: Nov. 24, 2015

(54) STORAGE SYSTEM FOR SUPPORTING USE OF MULTIPLE KEYS

(75) Inventor: Jae-Bum Lee, Yongin-Si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 453 days.

(21) Appl. No.: 13/604,135

(22) Filed: Sep. 5, 2012

(65) Prior Publication Data

US 2013/0159655 A1 Jun. 20, 2013

(30) Foreign Application Priority Data

Dec. 16, 2011 (KR) .................. 10-2011-0136796

(51) Int. Cl.
*G06F 12/14* (2006.01)
*G06F 21/62* (2013.01)

(52) U.S. Cl.
CPC ........ *G06F 21/6218* (2013.01); *G06F 12/1466* (2013.01)

(58) Field of Classification Search
CPC .................................................. G06F 12/1466
See application file for complete search history.

(56) References Cited

U.S. PATENT DOCUMENTS

| 2005/0086497 A1 | 4/2005 | Nakayama |
| 2010/0275036 A1 | 10/2010 | Harada et al. |
| 2012/0310379 A1* | 12/2012 | Chiba ............................ 700/79 |

FOREIGN PATENT DOCUMENTS

| JP | 2004199138 A | 7/2004 |
| KR | 20100099871 A | 9/2010 |

* cited by examiner

*Primary Examiner* — Yong Choe
(74) *Attorney, Agent, or Firm* — Harness, Dickey & Pierce, PLC

(57) ABSTRACT

A storage system that enables the use of a plurality of keys respectively stored in a plurality of storage units of a storage device is provided. The storage system includes a storage device including a first storage unit and a second storage unit that are recognized as a single storage device, wherein the first storage unit is configured to store a first key, the second storage unit is configured to store a second key different from the first key, and a controller is configured to transmit to the storage device one of a first key-read control signal that includes information about the first storage unit and a second key-read control signal that includes information about the second storage unit and receive the first key and the second key as identification information of the storage device in response to the first key-read control signal and the second key-read control signal, respectively.

11 Claims, 14 Drawing Sheets

STORAGE SYSTEM FOR SUPPORTING USE OF MULTIPLE KEYS

This application claims priority from Korean Patent Application No. 10-2011-0136796 filed on Dec. 16, 2011 in the Korean Intellectual Property Office, the disclosure of which is incorporated herein by reference in its entirety.

BACKGROUND

1. Field of the Invention

Example embodiments relate to a storage system, and more particularly, to a storage system for supporting the use of multiple keys stored in the storage system.

2. Description of the Related Art

Flash memories can electrically erase their data in entire cells at a time. Thus, they are being widely used in computers, memory cards, and the like. A recent surge in the use of mobile information devices such as mobile phones, personal data assistants (PDAs) and digital cameras is causing flash memories to rapidly replace hard disks. The above mobile devices increasingly require large-capacity storage devices in order to provide various functions (for example, a video playback function and a high sound-quality music playback function).

One large-capacity flash memory module can be produced using one large-capacity flash memory chip. However, out of economic need, attempts are being made to produce one large-capacity flash memory module by combining a plurality of low-capacity flash memory chips. If a unique key is stored in each low-capacity flash memory chip, it means that a plurality of keys is stored in one large-capacity flash memory module. Therefore, a technology that enables the use of a plurality of keys stored in one large-capacity flash memory module is required.

SUMMARY

Some example embodiments provide a storage system that enables the use of a plurality of keys respectively stored in a plurality of storage units of a storage device.

Some example embodiments provide a system that can perform an encryption operation with increased security by using a plurality of keys stored in one storage system.

According to an example embodiment, there is provided a storage system comprising a storage device comprising a first storage unit and a second storage unit that are recognized as a single storage device, wherein the first storage unit stores a first key, and the second storage unit stores a second key different from the first key, and a controller transmitting to the storage device one of a first key-read control signal that includes information about the first storage unit and a second key-read control signal that includes information about the second storage unit and receiving the first key as identification information of the storage device and as a response to the first key-read control signal and receiving the second key as the identification information of the storage device and as a response to the second key-read control signal.

According to another example embodiment, there is provided a storage system comprising a storage device comprising a first storage unit and a second storage unit that are recognized as a single storage device, wherein the first storage unit stores a first key, and the second storage unit stores a second key different from the first key, and a controller transmitting to the storage device a key-read control signal that includes information about the first storage unit and information about the second storage unit and receiving from the storage device data about the first key and the second key as identification information of the storage device and as a response to the key-read control signal.

According to another example embodiment, there is provided a storage system comprising a storage device comprising a first storage unit and a second storage unit that are recognized as a single storage device, determining a key output target storage unit in response to a key-read control signal according to a key output target storage unit determination rule that does not limit the key output target storage unit to a particular storage unit, and providing a key included in the determined key output target storage unit, wherein the first storage unit stores a first key, and the second storage unit stores a second key different from the first key, and a controller providing the key-read control signal to the storage device in response to a key provision request from an external device, receiving from the storage device at least one of the first key and the second key as identification information of the storage device and as a response to the key-read control signal, and outputting the received key or keys to the external device.

According to another example embodiment, there is provided a storage system comprising a storage device comprising a plurality of storage units that are recognized as a single storage device by an external device and each of which stores a key, and a controller providing a key address query control signal, which comprises information about an address query target storage unit, to the storage device if receiving a key address query request, which comprises the information about the address query target storage unit, from the external device and outputting to the external device a global key address that is received from the storage device as a response to the key address query control signal and providing a read command set, which comprises the global key address, to the storage device if receiving a key provision request, which designates the global key address, from the external device and outputting to the external device a key that is received from the storage device as identification information of the storage device and as a response to the read command set, wherein the storage device finds a local address of a key stored in the address query target storage unit designated by the key address query control signal, converts the local address into a global address, and provides the global address to the controller.

According to another example embodiment, there is provided a content encryption system comprising a storage system comprising a plurality of storage units that are recognized as a single storage device by a host and each of which stores a key, and a host selecting from the storage units a first storage unit and a second storage unit different from the first storage unit and inputting a first key provision request that comprises information about the first storage unit and a second key provision request that comprises information about the second storage unit to the storage system, wherein the storage system reads a key stored in the first storage unit and a key stored in the second storage unit and provides the read keys to the host, and the host encrypts target content using the key stored in the first storage unit as an encryption key and then encrypts the encrypted target content using the key stored in the second storage unit as an encryption key.

According to an example embodiment, there is provided a controller configured to transmit to a storage device a key-read control signal, the key-read control signal including information about at least one of a plurality of storage units stored in the storage device that are recognized as a single storage device by an external device, and the controller is configured to receive a key associated with the at least one of the plurality of storage units as identification information in response to the key-read control signal.

The controller may be configured to transmit the key-read control signal to the storage device in response to a key provision request from an external device and to output the received key associated with the at least one of the plurality of storage units to the external device. The controller may be configured to output to the external device a global key address that is received from the storage device in response to the key-read control signal. The controller may be configured to provide a read command set to the storage device if receiving a key provision request that designates the global key address from the external device, the read command set including the global key address, and the controller is configured to output to the external device a key that is received from the storage device as identification information of the storage device in response to the read command set.

According to an example embodiment, there is provided a storage device including a plurality of storage units that are recognized as a single storage device by an external device, each of the plurality of storage units configured to store a key, the storage device configured to receive a key-read control signal including information about at least one of the plurality of storage units, to find a local address of each of the keys stored in the at least one of the plurality of storage units, to convert the local address into a global address, and to provide the global address to a controller as identification information.

BRIEF DESCRIPTION OF THE DRAWINGS

The above and other aspects and features of example embodiments will become more apparent by describing in detail example embodiments thereof with reference to the attached drawings, in which.

DETAILED DESCRIPTION OF EXAMPLE EMBODIMENTS

Figure 1:
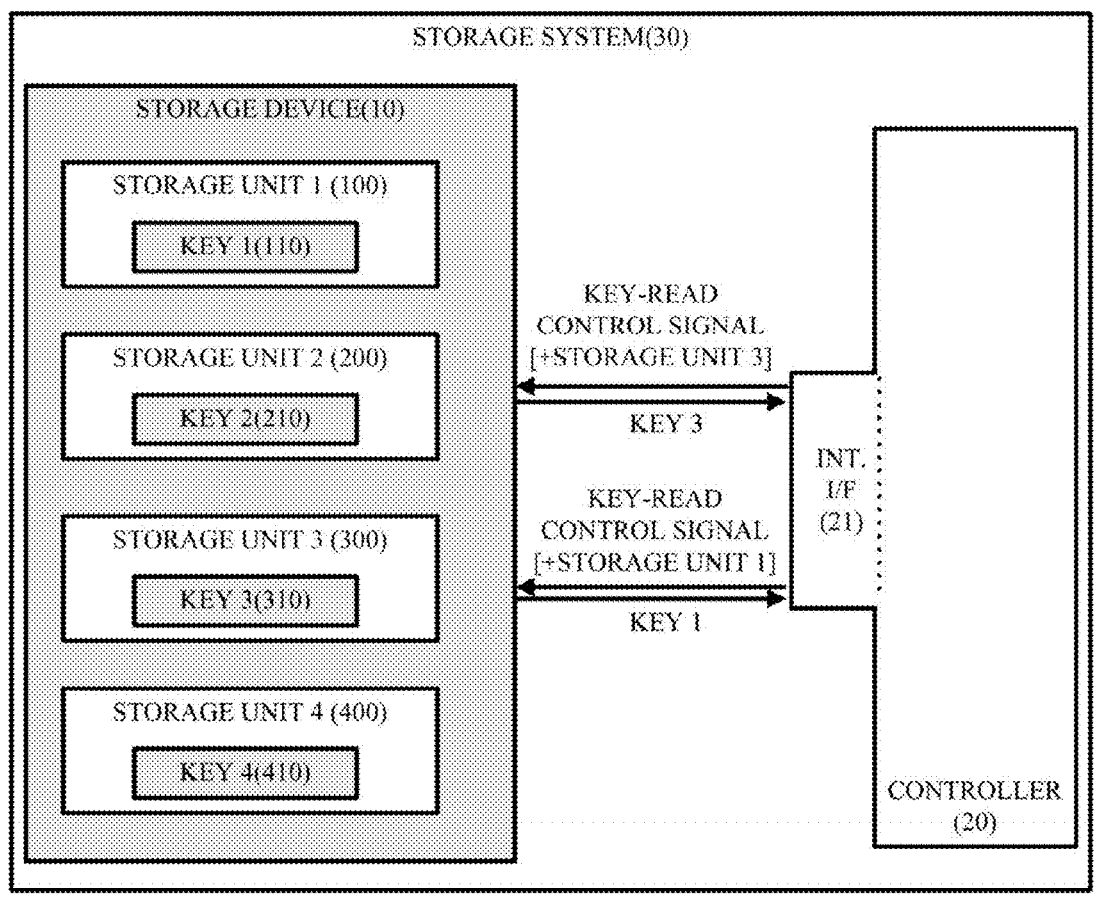
FIGS. 1 through 3 are diagrams of a storage system according to a first example embodiment.

Example embodiments will now be described more fully hereinafter with reference to the accompanying drawings, in which some example embodiments are shown. Example embodiments may, however, be embodied in different forms and should not be construed as limited to the example embodiments set forth herein. Rather, these example embodiments are provided so that this disclosure will be thorough and complete, and will fully convey the scope of example embodiments to those skilled in the art. The same reference numbers indicate the same components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

The use of the terms "a" and "an" and "the" and similar referents in the context of describing the example embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

First of all, elements commonly applied to storage system 30 for supporting the use of multiple keys according to first through sixth example embodiments will be described. The storage system 30 for supporting the use of multiple keys according to the first through sixth example embodiments may include a storage device 10 and a controller 20 that controls the storage device 10 and is connected to an external device 40.

The storage device 10 includes a plurality of storage units (for example, first through fourth storage units 100 through 400). The storage units are non-volatile memories. The storage units may be chips or packages using a NAND-flash memory, a NOR-flash memory, a phase change random access memory (PRAM), a magnetic random access memory (MRAM), or a resistive random access memory (RRAM) as a storage medium.

A plurality of storage units included in one storage device 10 may be non-volatile memories of the same or different types and may have the same or different storage capacities.

The storage device 10 may include a substrate (not shown). The storage units may be mounted on the substrate. The substrate may include an internal logic 500 that exchanges signals with the controller 20, processes control signals received from the controller 20, provides commands to the storage units, and receive responses from the storage units. The substrate may include a bus (not shown) through which data is input to or output from the storage units and relevant control signals are transmitted. The bus may be connected to the storage units. The bus may be connected to the internal logic.

A plurality of storage units included in one storage device 10 is recognized as a single storage device by a device that uses the storage device 10. The device that uses the storage device 10 may be any device connected to the controller 20. For ease of description, the device that uses the storage device 10 will be referred to as the external device 40.

The external device 40 may be a cellular phone, a personal digital assistant (PDA), a digital camera, a camcorder, a portable audio player (for example, an MP3 player), a portable media player (PMP), or the like.

If a plurality of storage units are recognized as a single storage device by the external device 40, the external device 40 drives the storage units through a single interface by using a single file system. The external device 40 may assign one storage device identifier to the storage device 10. For example, even if the storage device 10 includes four storage units, one root directory (for example, F:) may be assigned to the storage device 10. The external device 40 may not recognize the existence of a plurality of storage units in one storage device 10. For example, if the storage device 10 includes four storage units, each having a storage capacity of 4 gigabytes, the external device 40 may recognize the storage device 10 as a single storage device having a storage capacity of 16 gigabytes.

A plurality of storage units included in one storage device 10 may be understood as physically discrete non-volatile memory chips or packages.

A plurality of storage units included in one storage device 10 may store respective keys at the same or different addresses. A key may be stored, not in a user region, but in a system region of each storage unit, so that the key cannot be updated or deleted. If the key is stored in the system region of each storage unit, each storage unit can support a key-read command for reading the key that is distinct from a command for reading data stored in the user region.

The key stored in each storage unit may be a unique ID assigned to each storage unit.

The storage system 30 for supporting the use of multiple keys according to the first example embodiment will be described with reference to FIGS. 1 through 3.

FIG. 1 illustrates a case where a third key 310 of a third storage unit 300 and a first key 110 of a first storage unit 100 included in the storage device 10 of the storage system 30 are provided to the controller 20 as an example.

The controller 20 transmits a key-read control signal, which includes information about the third storage unit 300, to the storage device 10 through an internal interface 21, and the storage device 10 transmits the third key 310 stored in the third storage unit 300 to the controller 20 through the internal interface 21.

The controller 20 transmits a key-read control signal, which includes information about the first storage unit 100, to the storage device 10 through the internal interface 21, and the storage device 10 transmits the first key 110 stored in the first storage unit 100 to the controller 20 through the internal interface 21.

As shown in FIG. 1, the storage device 10 included in the storage system 30 according to the current example embodiment receives from the controller 20 a key-read control signal that includes information about a key output target storage unit, so that all keys included in the storage device 10 can be utilized by the external device 40. According to the conventional art, a predetermined representative key only can be utilized from among a plurality of keys included in the storage device 10. In the current example embodiment, a key-read control signal that includes information about a key output target storage unit is provided to the storage device 10. The storage device 10 receives the key-read control signal, interprets the information about the key output target storage unit included in the received key-read control signal, reads a key from the key output target storage unit, and provides the read key to the controller 20.

The key-read control signal may include a first command signal, an address signal, and a second command signal sequentially. The information about the key output target storage unit may be included in the address signal.

Figure 2:
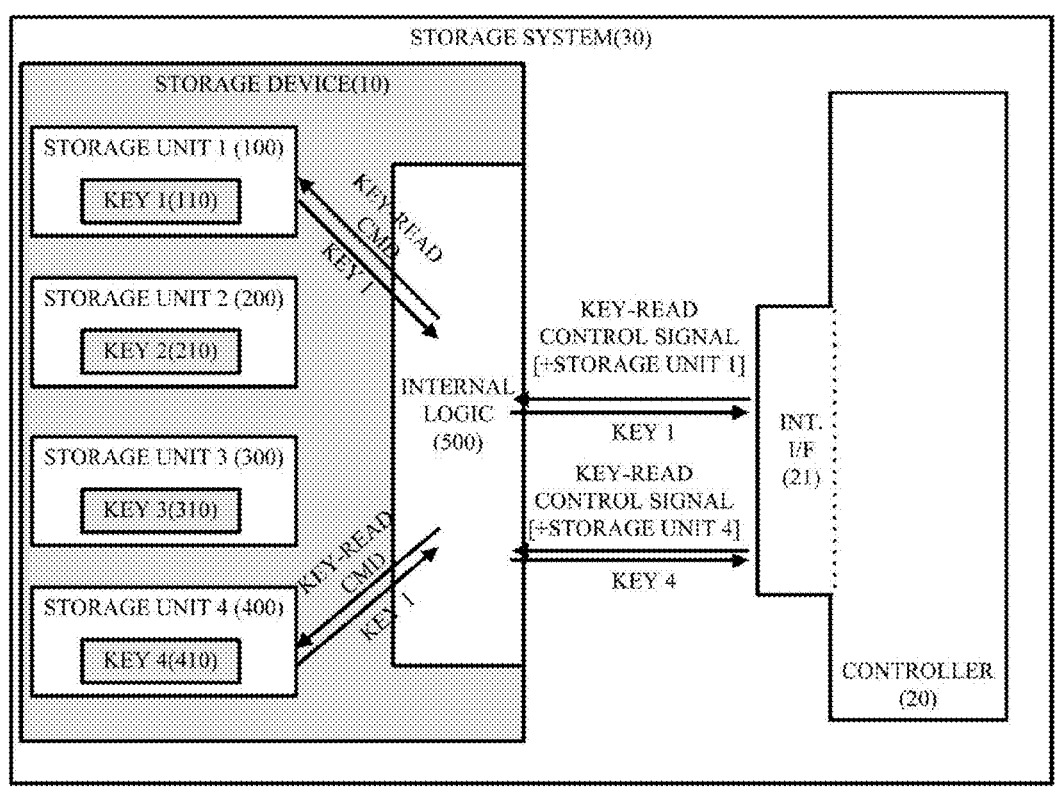

FIG. 2 illustrates a case where the storage device 10 included in the storage system 30 according to the current example embodiment receives a key-read control signal that includes information about a key output target storage unit, inputs a key-read command to the key output target storage unit, reads a key stored in the key output target storage unit, and provides the read key to the controller 20 is illustrated.

If the storage device 10 included in the storage system 30 according to the current example embodiment receives a key-read control signal that designates a key output target storage unit from the controller 20, the internal logic 500 may read a key stored in the key output target storage unit by simply inputting a key-read command to the key output target storage unit. To read the key stored in the key output target storage unit, the internal logic 500 or the controller 20 needs to know a local address at which the key is stored in the key output target storage unit.

The key-read command does not include an address of data to be read and is different from a read command used to read general data stored in the user region. Each storage unit receives the key-read command and outputs stored key data in response to the received key-read command.

The local address denotes an address in each storage unit and is provided to each storage unit if each storage unit processes a data read command. A global address denotes an address in the entire storage device 10 and may be a logical or physical address used if the controller 20 processes a data read request from the external device 40.

Figure 3:
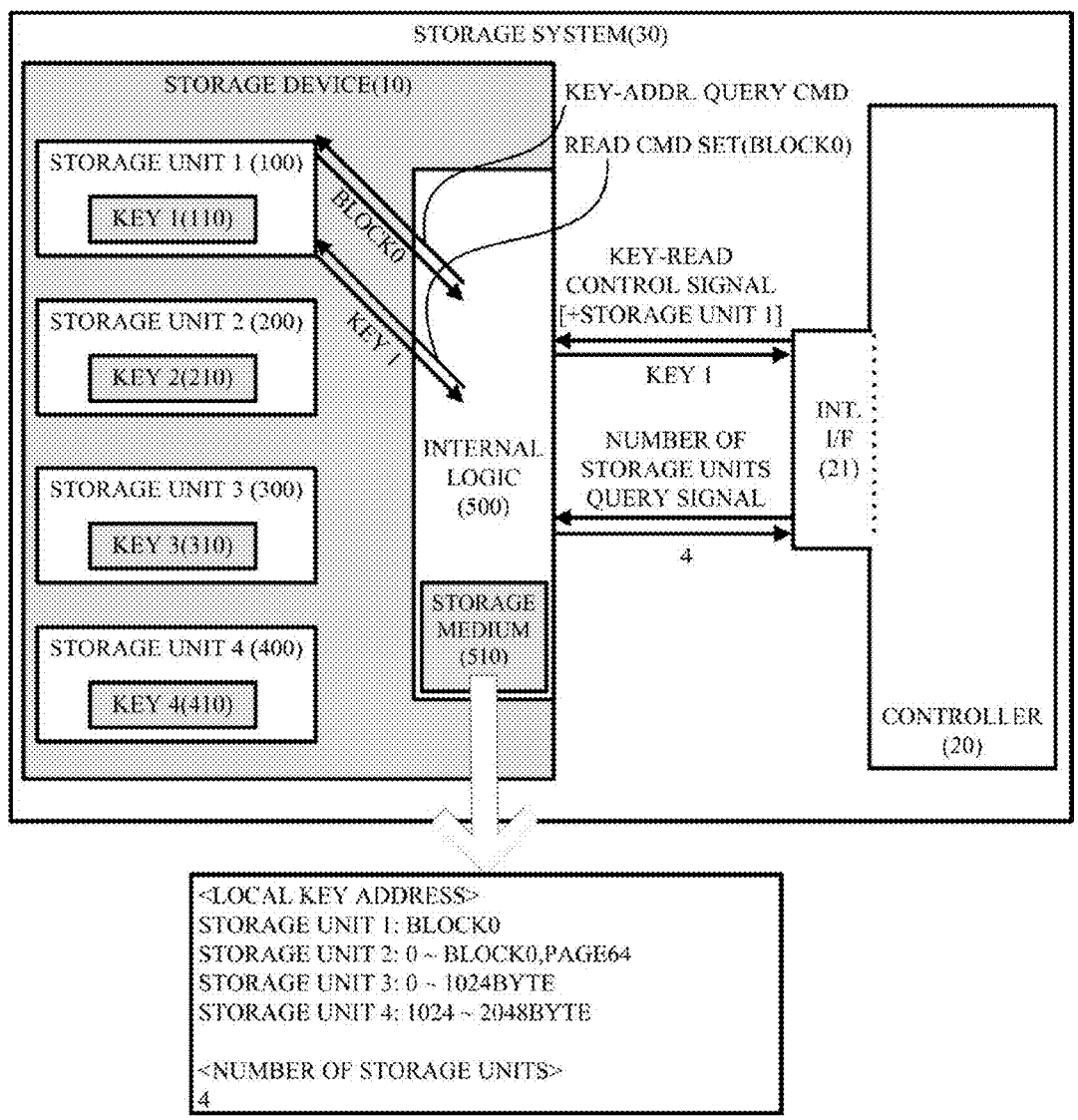

In FIG. 3, the storage device 10 included in the storage system 30 according to the current example embodiment reads a key stored in each storage unit without using the key-read command.

Referring to FIG. 3, if the first through fourth storage units 100 through 400 included in the storage device 10 do not support the key-read command, the internal logic 500 should identify a local address indicating the position of a key in a key output target storage unit in order to read the key from the key output target storage unit designated by a key-read control signal transmitted from the controller 20. The local address indicating the position of the key in the key output target storage unit will hereinafter be referred to as a 'local key address.'

The local key address may be stored in a storage medium 510 included in the internal logic 500. For example, referring to FIG. 3, if a key-read control signal for reading the first key 110 from the first storage unit 100 is received, since a local address of the first key 110 in the first storage unit 100 is BLOCK0 as stored in the storage medium 510, the internal logic 500 may input a read command set, which designates BLOCK0 as an address, to the first storage unit 100 and read the first key 110 from the first storage unit 100.

The storage medium 510 may be configured as a non-volatile memory such as a read-only memory (ROM), a programmable ROM (PROM), an erasable programmable ROM (EPROM), an electrically erasable programmable ROM (EEPROM), or a flash memory.

The read command set may be a series of signals input to a storage unit in order to read data, such as a read start command, a data address and a read terminate command.

Referring to FIG. 3, the local key address may be stored in various forms. For example, the first storage unit 100 may receive the read command set on a block-by-block basis, the second storage unit 200 may be receive the read command set on a block-by-block basis and a page-by-page basis, and the third storage unit 300 and the fourth storage unit 400 may receive the read command set on a byte-by-byte basis.

Even if the local key address is not included in the internal logic 500, it can be obtained by inputting a key address query command to a storage unit. Referring to FIG. 3, to obtain the local address of the first key 110 in the first storage unit 100, the internal logic 500 may input a key address query command to the first storage unit 100 and receive BLOCK0, which is the position of the first key 110 in the first storage unit 100, from the first storage unit 100.

The storage device 10 may provide the number of storage units therein to the external device 40 via the controller 20. The external device 40 can identify the number of keys that can be utilized based on the number of storage units included in the storage device 10. The number of storage units may further be stored in the storage medium 510 of the internal logic 500. The controller 20 may transmit a storage unit number query control signal to the internal logic 500 and receive the number of storage units. The controller 20 may transmit the received number of storage units to the external device 40 in response to a storage unit number query request from the external device 40.

The storage system 30 for supporting the use of multiple keys according to the second example embodiment will be described with reference to FIG. 4.

Figure 4:
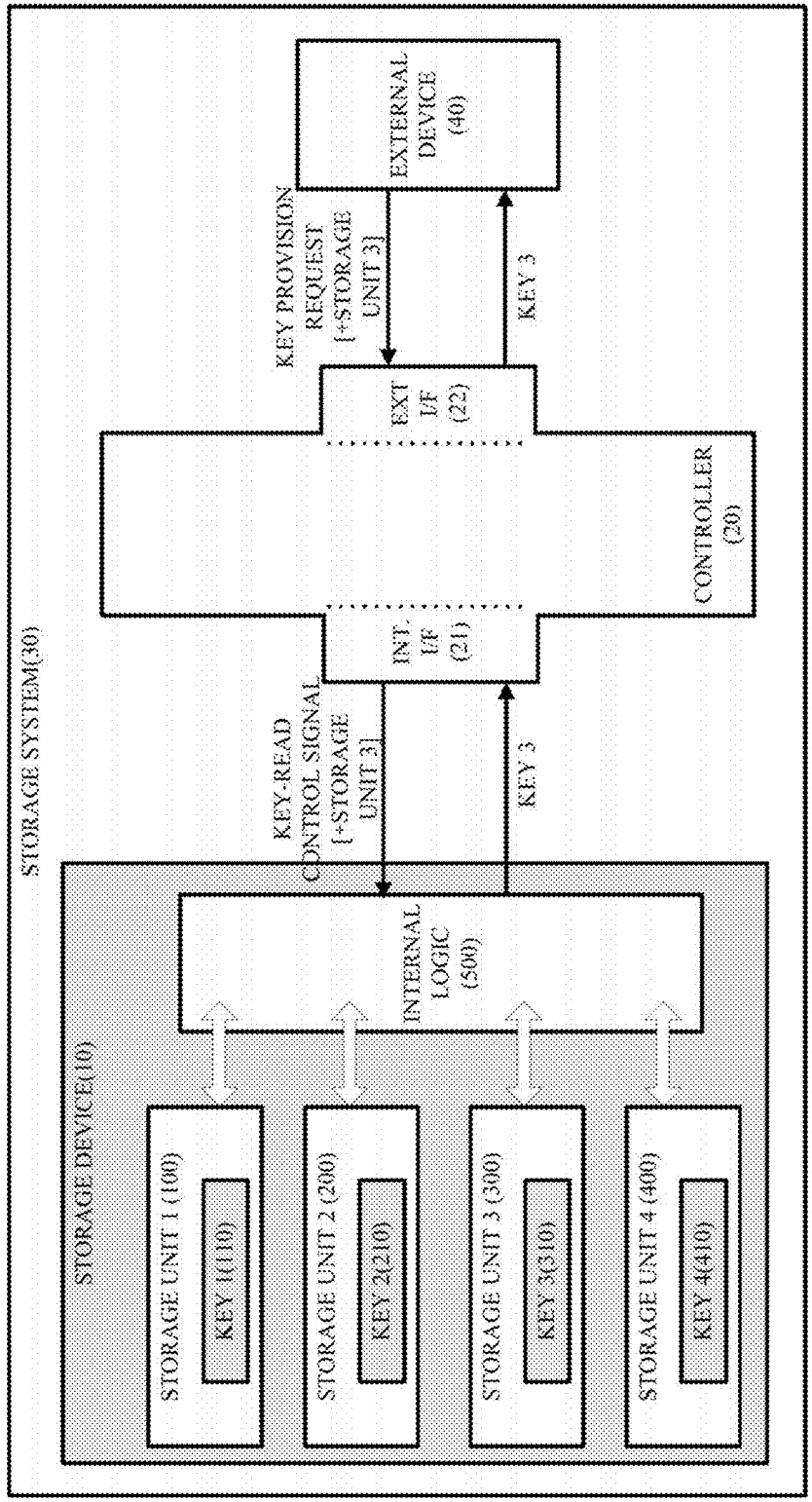
FIG. 4 is a diagram of a storage system according to a second example embodiment.

Referring to FIG. 4, if receiving a key provision request that includes information about a key output target storage unit from the external device 40, the controller 20 transmits a key-read control signal that includes the information about the key output target storage unit to the internal logic 500.

As shown in FIG. 4, although the external device 40 recognizes the storage device 10 as a single storage device, it can utilize all four keys 110 through 410 included in the storage device 10 by inputting the key provision request as well as the information about the key output target storage unit to the controller 20.

The controller 20 may further include an external interface 22 for signal exchange with the external device 40. The external interface 22 may be an interface using a wired/wireless communication scheme such as universal serial bus (USB), Bluetooth, high-definition multimedia interface (HDMI), PS/2, or WiFi.

The storage system 30 for supporting the use of multiple keys according to the third example embodiment will be described with reference to FIGS. 5 and 6. The storage system 30 according to the current example embodiment may stop a certain storage unit from outputting a stored key value if the key value is leaked by a malicious hacking attempt.

Figure 5:
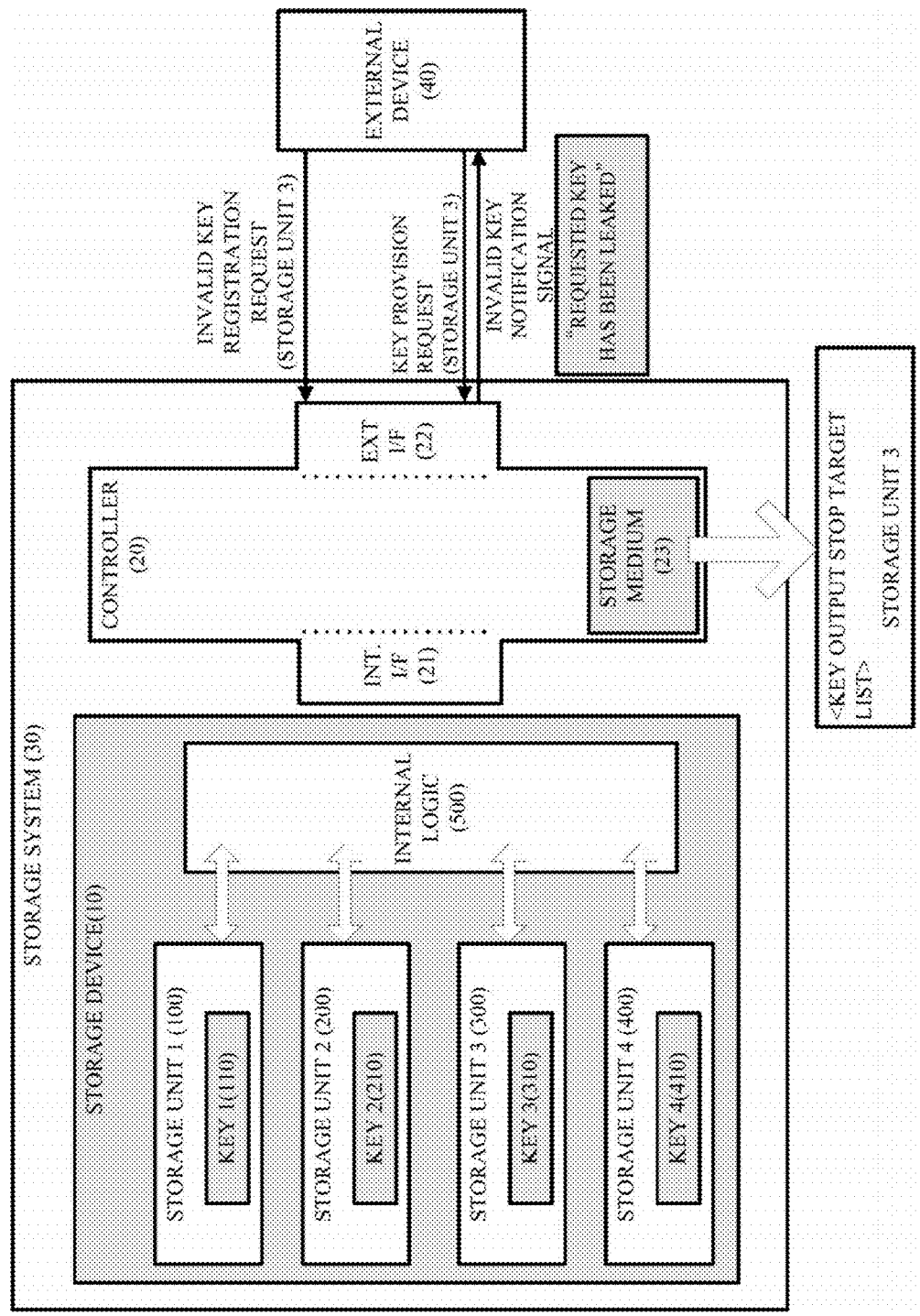
FIGS. 5 and 6 are diagrams of a storage system according to a third example embodiment.

Referring to FIG. 5, the external device 40 inputs an invalid key registration request, which includes information about a key output stop target storage unit (for example, the third storage unit 300), to the controller 20. The controller 20 adds the key output stop target storage unit to a key output stop target list stored in a storage medium 23. If receiving from the external device 40 a key provision request signal that designates the key output stop target storage unit as a key output target storage unit, the controller 20 checks the key output stop target list stored in the storage medium 23 and transmits an invalid key notification signal to the external device 40.

In FIG. 5, the external device 40 provides information about a key output stop target storage unit to the controller 20, and the controller 20 stores the information about the key output stop target storage unit. If receiving a key provision request signal from the external device 40, the controller 20 checks whether a corresponding key output target storage unit exists in the key output stop target list in order to prevent a leaked key from being used any longer.

If identifying that a requested key has been leaked, the external device 40 may request a key stored in another storage unit. In the conventional art, a key stored in one storage unit can only be used. Thus, if the key is leaked, the entire storage device cannot be used. In the current example embodiment, even if some of a plurality of keys stored respectively in a plurality of storage units is leaked, the other keys can still be used.

Information about a key output stop target storage unit provided by the external device 40 can be stored in the internal logic 500 of the storage device 10, instead of in the controller 20. Even if the controller 20 that stores the key output stop target list is replaced for malicious purposes, the use of a key stored in the key output stop target storage unit can be prevented. FIG. 6 illustrates the case where the information about the key output stop target storage unit provided by the external device 40 is stored in the internal logic 500.

Figure 6:
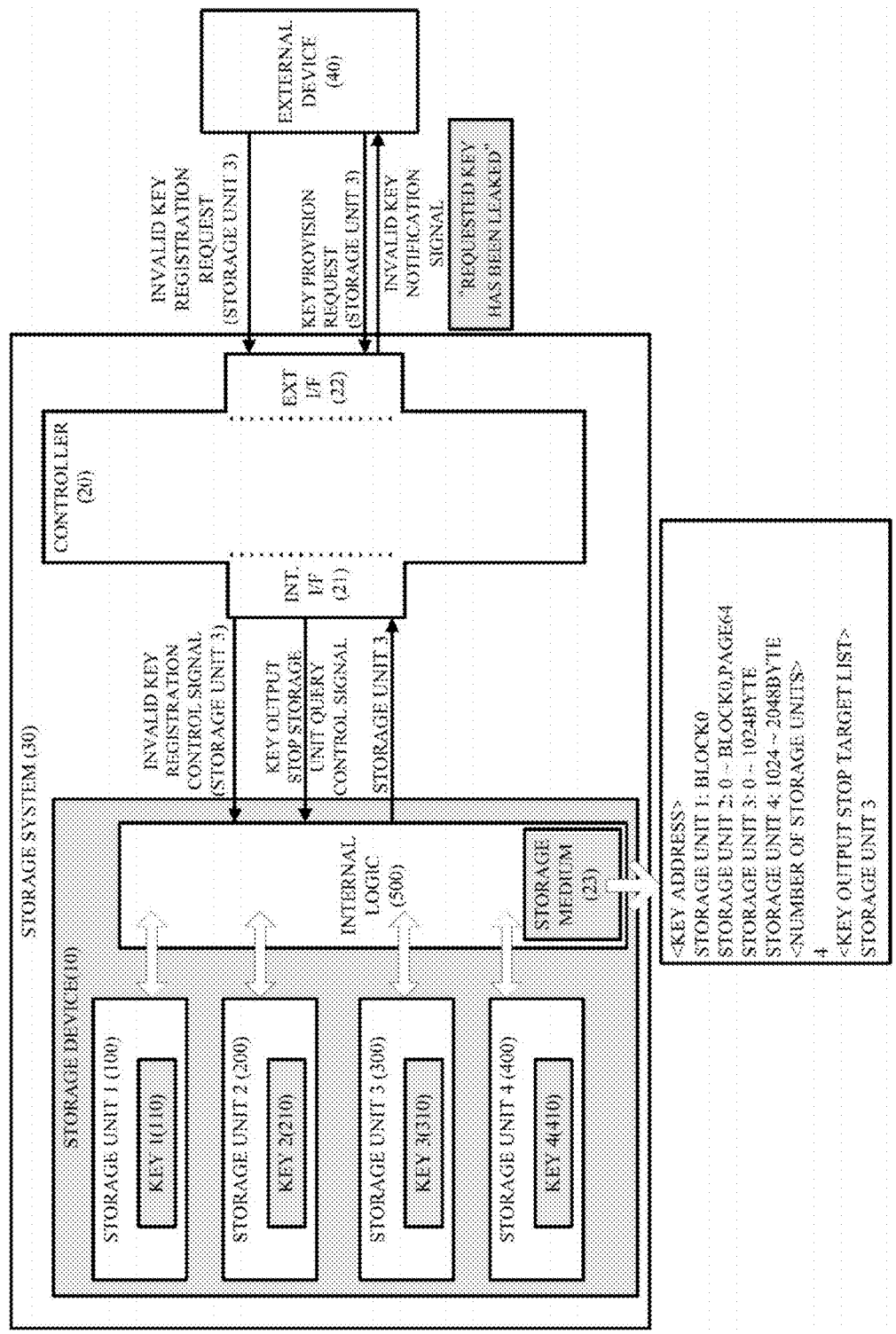

Referring to FIG. 6, the controller 20 transmits an invalid key registration control signal that includes the information about the key output stop target storage unit provided by the external device 40 to the internal logic 500, and the internal logic 500 stores the information about the key output stop target storage unit. The controller 20 can find the key output stop target storage unit by transmitting a key output stop storage unit query control signal to the internal logic 500. If receiving a key provision request signal from the external device 40, the controller 20 may check whether a corresponding key output target storage unit exists in the key output stop target list stored in the internal logic 500 in order to prevent a leaked key from being used any longer.

Although not shown in FIGS. 5 and 6, the controller 20 may receive an invalid key registration request that includes information about one or more invalid keys and perform an invalid key registration process. If receiving from the external device 40 a key provision request that includes information about a storage unit that stores one of the registered invalid keys, the controller 20 may output an invalid key notification signal to the external device 40. According to the current example embodiment, even if the controller 20 receives from the external device 40 information about an invalid key instead of a key output stop target storage unit, it can prevent the use of the invalid key.

The storage system 30 according to the current example embodiment includes the controller 20 that receives an invalid key registration request that includes information about a key output stop target storage unit from the external device 40 and performs an invalid key registration process for the key output stop target storage unit. If receiving from the external device 40 a key provision request that includes the information about the key output stop target storage unit, the controller 20 outputs an invalid key notification signal to the external device 40. The information about the key output stop target storage unit may be stored in the controller 20 or in the internal logic 500 of the storage device 10. Even if receiving from the external device 40 information about an invalid key instead of a key output stop target storage unit, the controller 20 may search for a storage unit that stores the invalid key and register the found storage unit as a key output stop target storage unit, thereby preventing the use of the invalid key.

The storage system 30 for supporting the use of multiple keys according to the fourth example embodiment will be described with reference to FIGS. 7 through 9. The storage system 30 according to the current example embodiment enables the external device 40 to designate a plurality of storage units as key output target storage units through a single key provision request.

Figure 7:
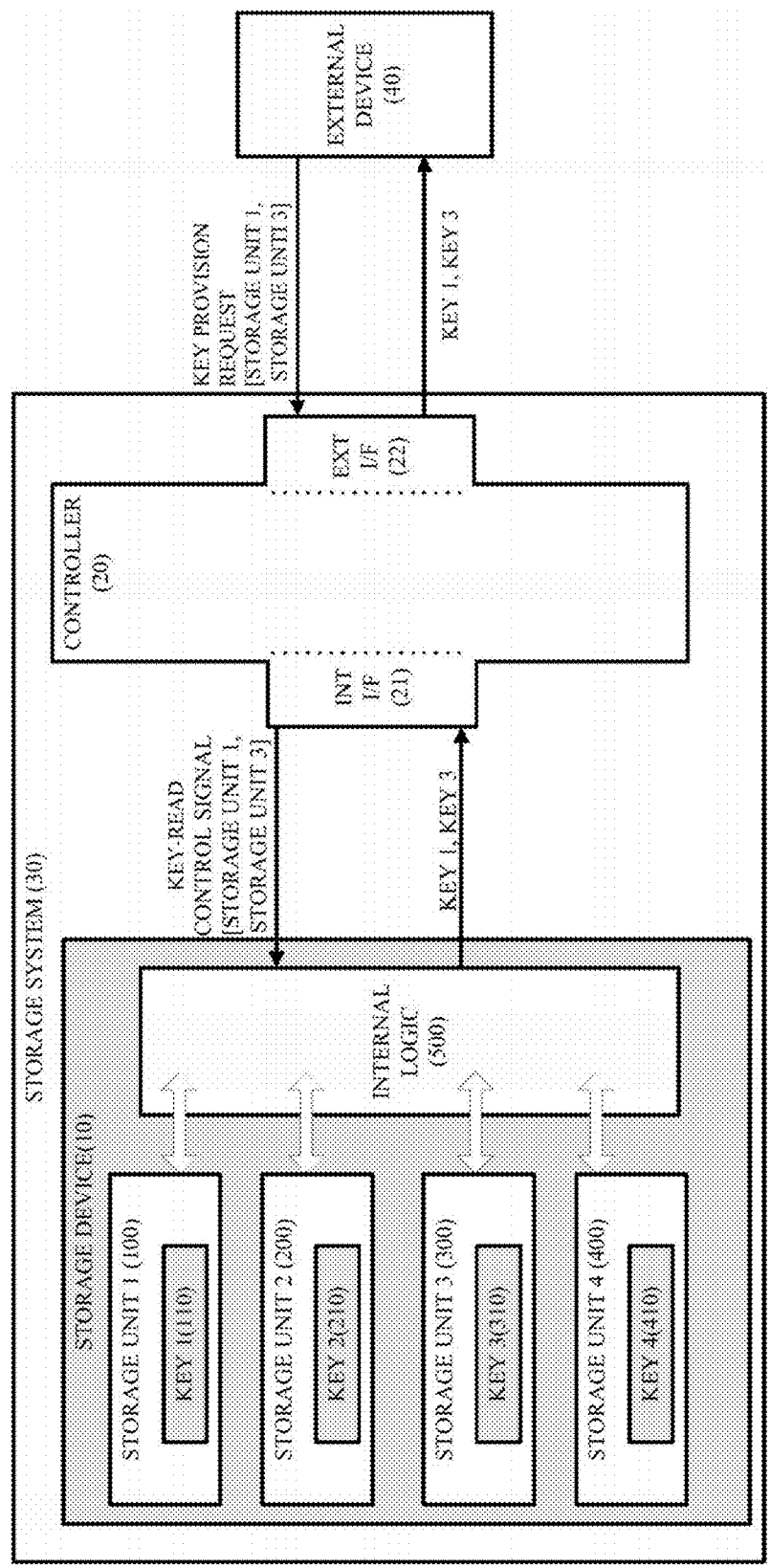
FIGS. 7 through 9 are diagrams of a storage system according to a fourth example embodiment.

Referring to FIG. 7, the external device 40 may provide a key provision request that includes information about the first storage unit 100 and information about the third storage unit 300 to the controller 20. The controller 20 may generate a key-read control signal that includes both the information about the first storage unit 100 and the information about the third storage unit 300 and transmit the generated key-read control signal to the internal logic 500. In response to the key-read control signal, the internal logic 500 may read the first and third keys 110 and 310 stored in the first and third storage units 100 and 300 by using various methods described above in the first through third example embodiments and provide the read first and third keys 110 and 310 to the external device 40 via the controller 20.

If the external device 40 designates a plurality of storage units as key output target storage units, keys stored in the key output target storage units may be individually output to the external device 40 as shown in FIG. 7. A single composite key generated using the keys stored in the key output target storage units can also be output to the external device 40.

The composite key may be generated using two or more input keys according to a composite key generation rule. The composite key generation rule is not limited to a particular rule. For example, performing a bit operation on input keys may be the composite key generation rule. The bit operation may use various operations including AND, OR, XOR, NAND, and NOR.

The composite key may be generated by the controller 20 or by the internal logic 500. In FIG. 8, the composite key is generated by the controller 20. In FIG. 9, the composite key is generated by the internal logic 500.

Figure 8:
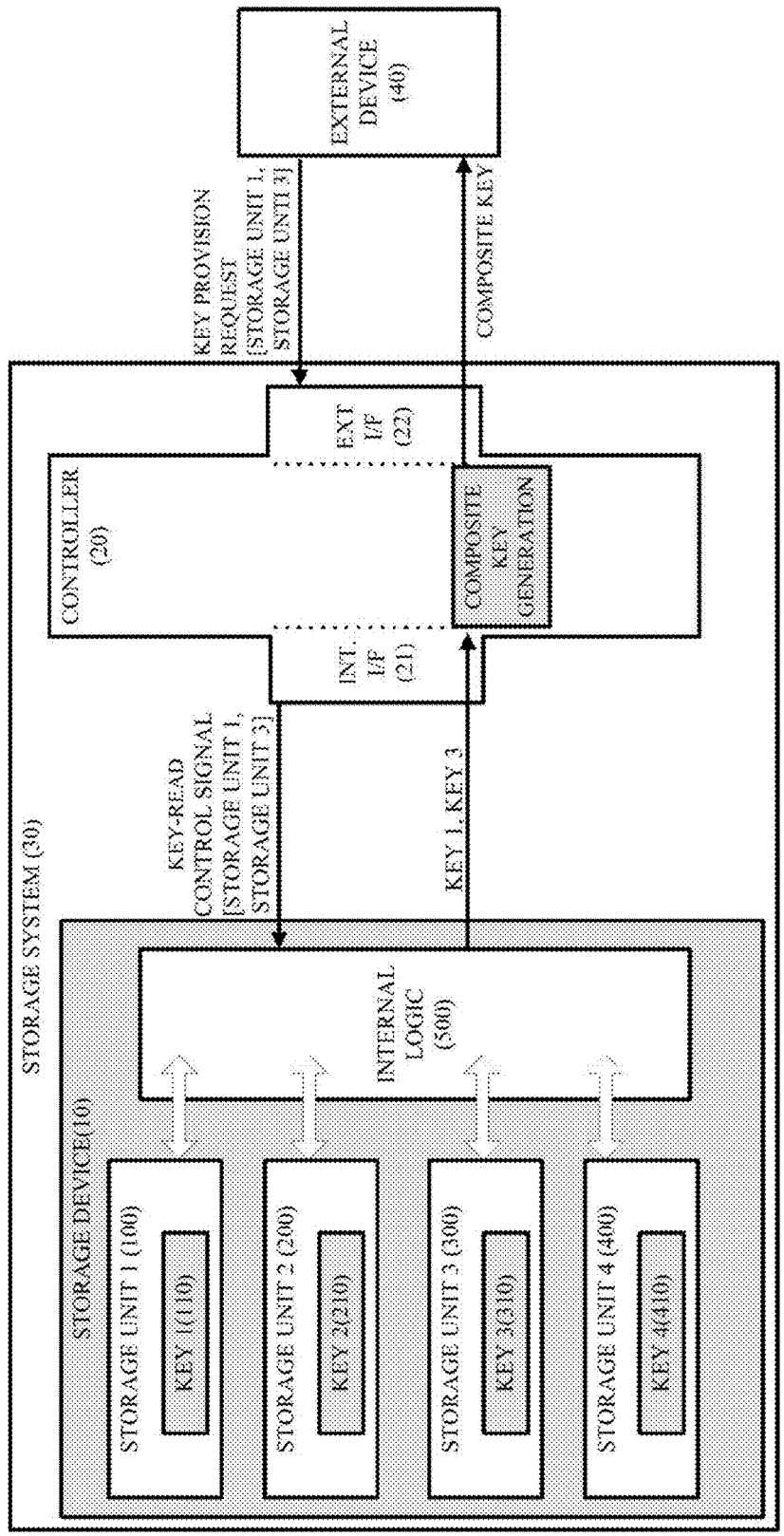

Referring to FIG. 8, the process performed until the controller 20 receives two keys (for example, the first and third keys 110 and 310) from the internal logic 500 is identical to the process illustrated in FIG. 7. The controller 20 generates a composite key using the received two keys and provides the generated composite key to the external device 40. The controller 20 may include an operation unit (not shown) that performs an operation related to the composite key generation rule.

Figure 9:
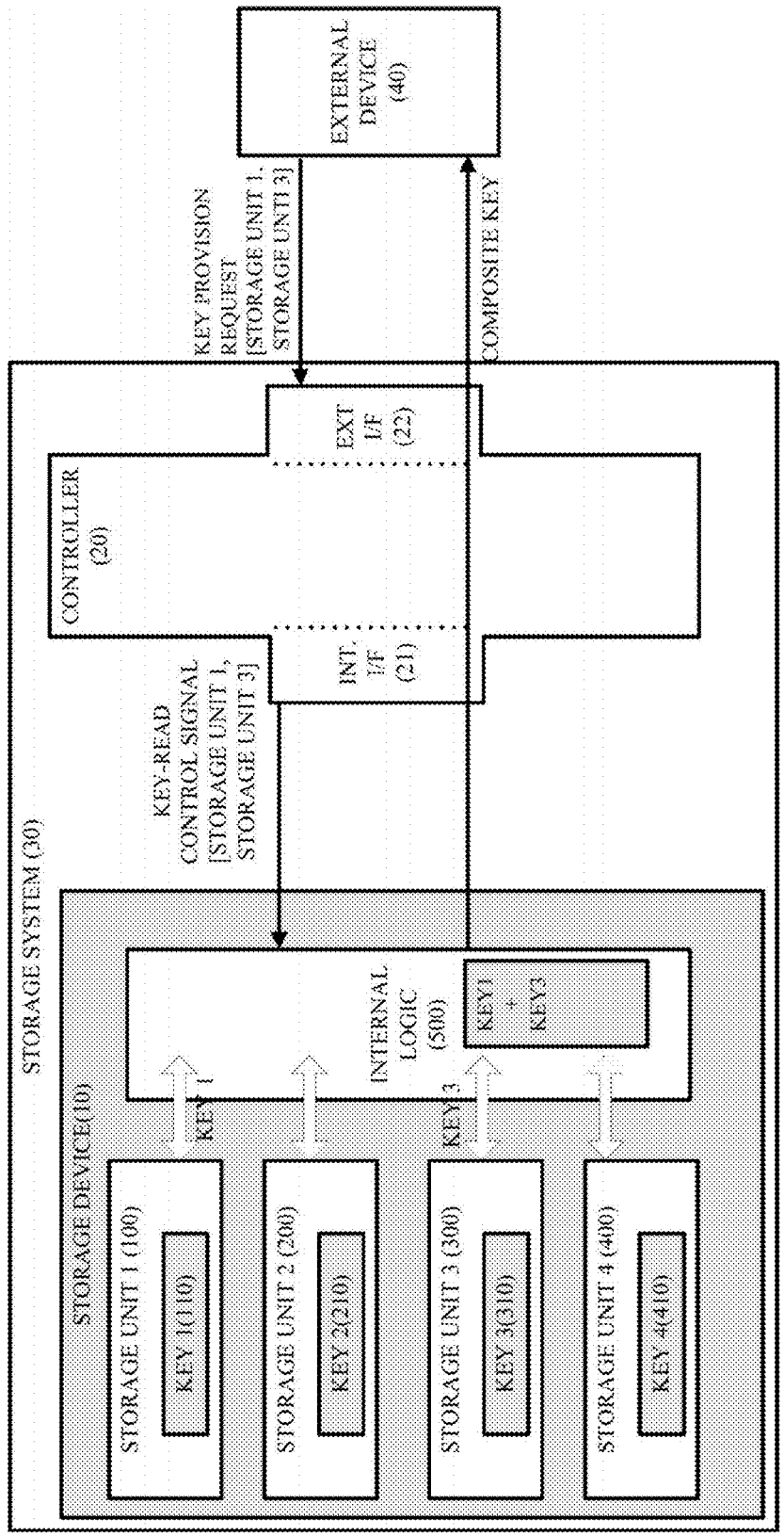

Referring to FIG. 9, the internal logic 500 generates a composite key using the first and third keys 110 and 310 read from the first and third storage units 100 and 300 and provides the generated composite key to the external device 40 via the controller 20.

Providing a composite key generated using a plurality of keys according to the current example embodiment to the external device 40 is comparable to providing various keys.

The storage system 30 for supporting the use of multiple keys according to the fifth example embodiment will be described with reference to FIG. 10. Even if the external device 40 does not designate a key output target storage unit, the storage system 30 according to the current example embodiment can determine a key output target storage unit on its own and provide a key stored in the determined key output target storage unit to the external device 40.

Figure 10:
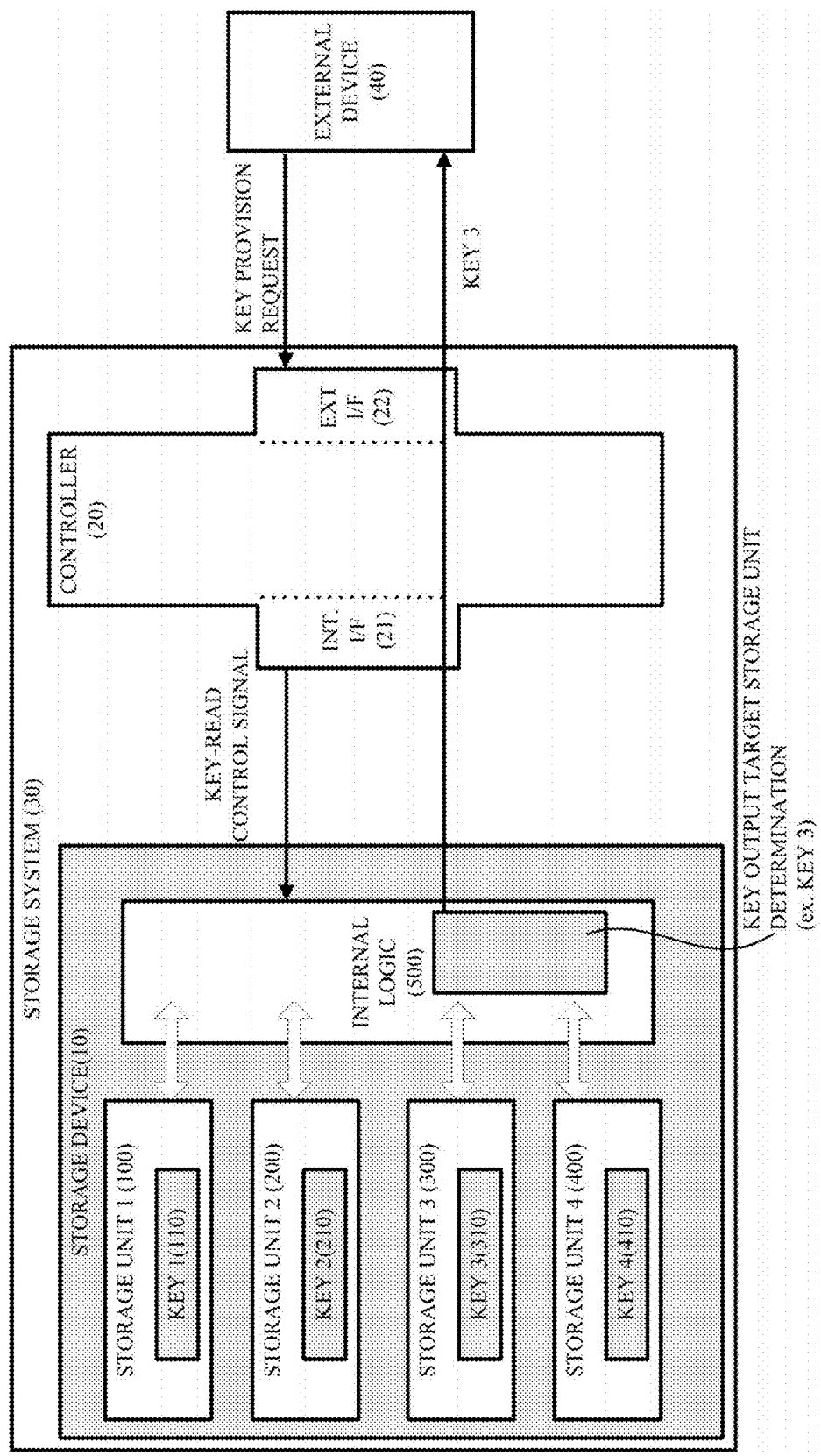
FIG. 10 is a diagram of a storage system according to a fifth example embodiment.

Referring to FIG. 10, a key provision request provided by the external device 40 to the controller 20 does not include information about a key output target storage unit. Likewise, a key-read control signal input to the internal logic 500 by the controller 20 does not include the information about the key output target storage unit. Instead, the internal logic 500 receives the key-read control signal and determines a key output target storage unit based on a key output target storage unit determination rule. The key output target storage unit determination rule may use various input parameters to determine a key output target storage unit. The parameters may include time and random number. The key output target storage unit determination rule does not include a rule that determines one fixed storage unit as a key output target storage unit.

The internal logic 500 reads a key stored in a storage unit determined as a key output target storage unit and provides the read key to the external device 40. The external device 40 cannot identify which storage unit stores the received key. Therefore, the internal logic 500 may further provide the controller 20 with at least one of information about the determined key output target storage unit and information about the key output target storage unit determination rule used to determine the key output target storage unit.

For example, referring to FIG. 10, if the external device 40 inputs a key provision request to the controller 20 without designating a key output target storage unit, the controller 20 may transmit a key-read control signal to the internal logic 500. The internal logic 500 may determine the third storage unit 300 as a key output target storage unit based on a key output target storage unit determination rule that uses a random number as a parameter. The internal logic 500 may provide the information 'key 3, storage unit 3 and random number generation' to the external device 40 via the controller 20.

The storage system 30 for supporting the use of multiple keys according to the sixth example embodiment will be described with reference to FIG. 11. The storage system 30 according to the current example embodiment may receive from the external device 40 a key provision request that does not include information about a key output target storage unit but includes an address of a key. The address of the key may denote a global key address. The meaning of the global key address has already been described above.

To request a key stored in a storage unit, the external device 40 should identify a global key address of the key. Referring to FIG. 11, the external device 40 provides a key address query request that includes information about, for example, the first storage unit 100 to the controller 20. The controller 20 that receives the key address query request transmits a key address query control signal that includes the information about the first storage unit 100 to the internal logic 500. As described above with reference to FIG. 3, the internal logic 500 can identify a local key address of the first storage unit 100.

The internal logic 500 converts the local key address of the first storage unit 100 into a global address. For this conversion, the internal logic 500 may store matching information of a zero area address and a global address for each storage unit. For example, if a local key address of the first storage unit 100 is BLOCK0, the internal logic 500 may convert the local key address into a global key address of 0 to 1024 bytes.

The internal logic 500 provides the global key address to the external device 40 via the controller 20.

The external device 40 can receive a value of the first key 110 by inputting a key provision request, which includes the global address of the first key 110 stored in the first storage unit 100, to the controller 20. Referring to FIG. 11, if receiving the above key provision request from the external device 40, the controller 20 may generate a read command set that includes the global address of the first key 110 and provide the generated read command set to the internal logic 500.

Figure 12:
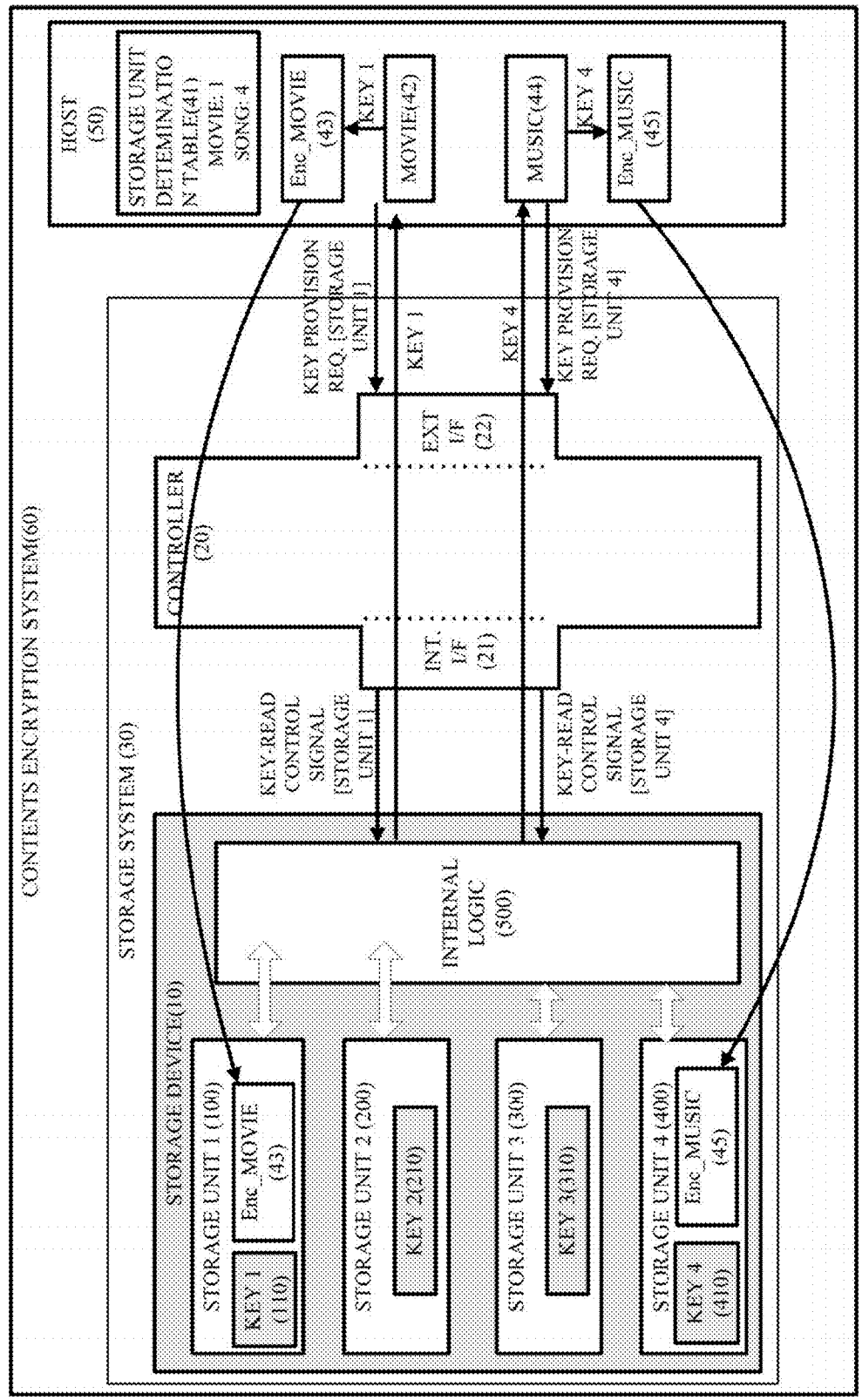
FIG. 12 is a diagram of a content encryption system according to a seventh example embodiment.

A content encryption system 60 according to a seventh example embodiment will be described with reference to FIG. 12. Referring to FIG. 12, the content encryption system 60 according to the current example embodiment may include a storage system 30 for supporting the use of multiple keys and a host 50. The host 50 may be a cellular phone, a PDA, a digital camera, a camcorder, a portable audio player (for example, an MP3 player), a PMP, or the like.

The storage system 30 can be understood as identical to the above-described storage system 30 according to the first through sixth example embodiments. The storage system 30 includes a plurality of storage units 100 through 400 that are recognized as a single storage device by the host 50 and store respective keys.

The host 50, according to the current example embodiment, may encrypt target content using a key stored in a storage device 10. The host 50 may use a different key according to at least one of the type of content to be encrypted and the content provider. The host 50 may determine an encryption key provision storage unit based on at least one of the type of content to be encrypted and the content provider and input a key provision request that includes information about the determined encryption key provision storage unit to the storage system 30. The encryption key provision storage unit may be determined with reference to a storage unit determination table 41.

Figure 11:
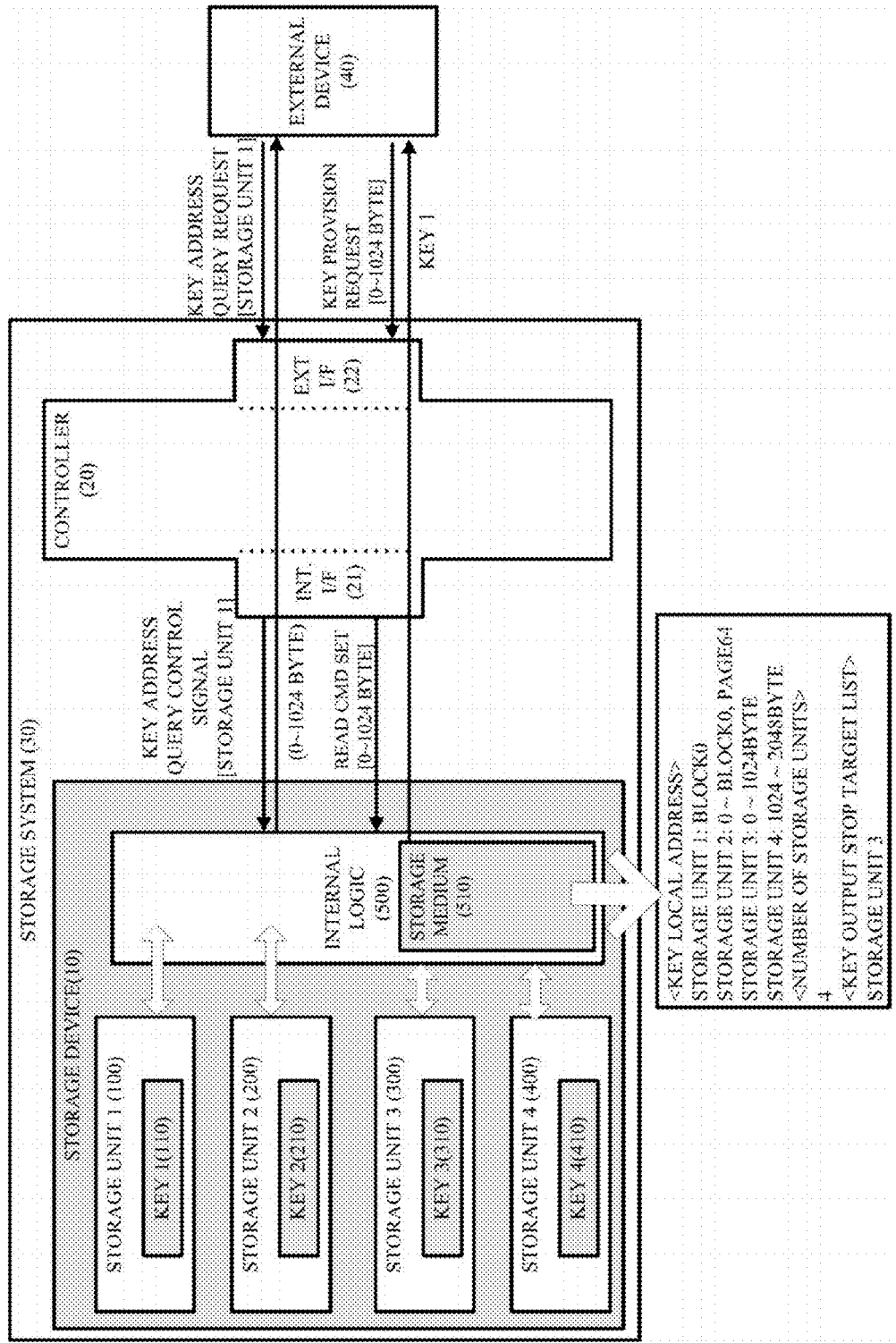
FIG. 11 is a diagram of a storage system according to a sixth example embodiment.

For example, as recorded in the storage unit determination table 41 of FIG. 11, a first key 110 stored in the first storage unit 100 may be used as an encryption key for movie 42, and a fourth key 410 stored in the fourth storage unit 400 may be used as an encryption key for music 44.

The host 50 may store encrypted movie content 43 in the first storage unit 100 and store encrypted music content 45 in the fourth storage unit 400.

The host 500 according to the current example embodiment may store encrypted content in any one of the storage units 100 through 400 included in the storage system 30. A key included in a storage unit in which content is to be stored may be used as an encryption key for the content.

A content encryption system according to an eighth example embodiment will be described with reference to FIG. 13.

Figure 13:
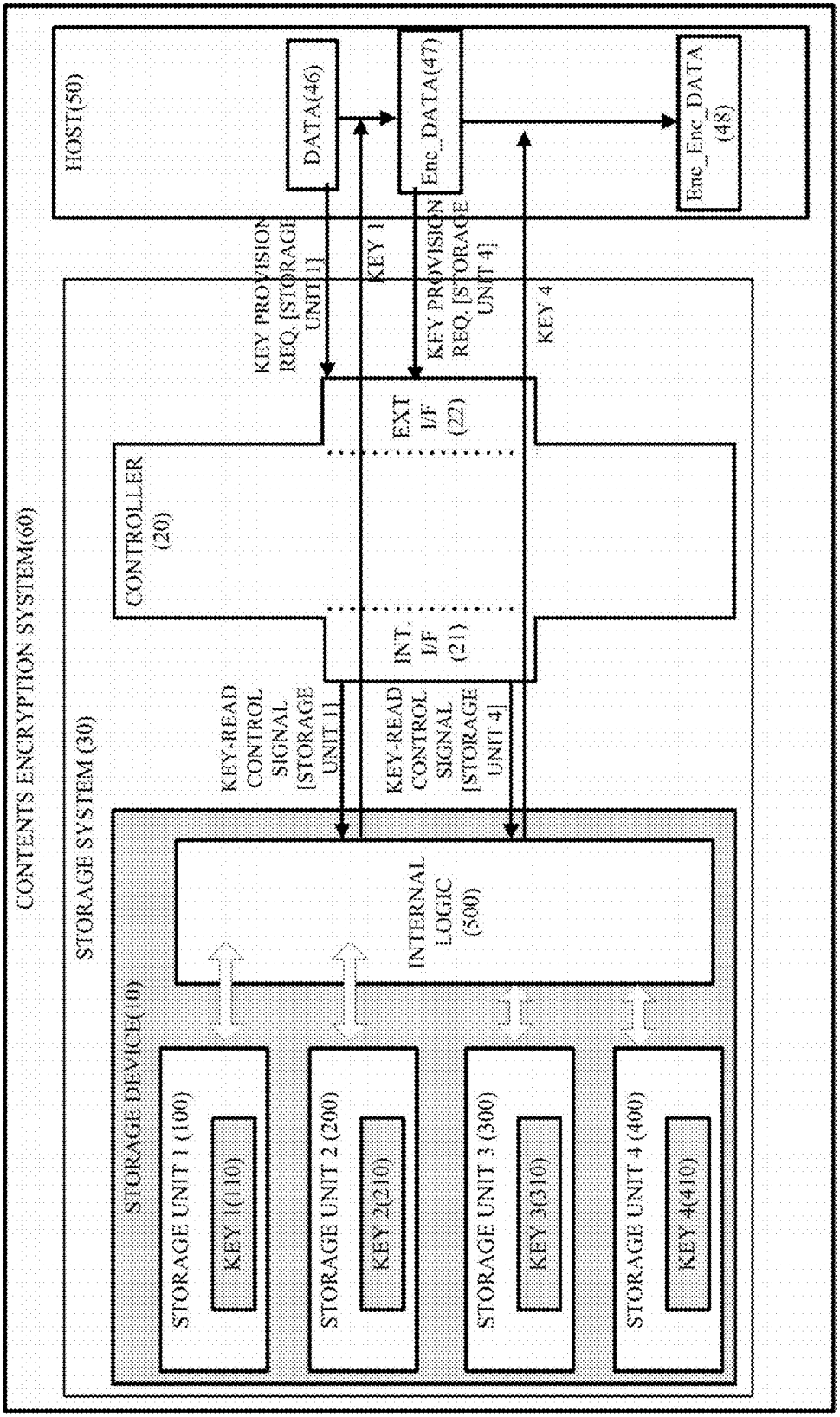
FIG. 13 is a diagram of a content encryption system according to an eighth example embodiment.

FIG. 13 is a diagram of a content encryption system 60 according to an eighth example embodiment. The content encryption system 60 according to the current example embodiment may include a storage system 30 for supporting the use of multiple keys and a host 50.

The host 50 according to the current example embodiment may encrypt target content two or more times using a plurality of keys stored in the storage system 30. For example, referring to FIG. 13, data 46 may be encrypted using a first key 110 stored in a first storage unit 100, and the encrypted data 47 may be encrypted again using a fourth key 410 stored in a fourth storage unit 400.

An encryption algorithm used for the first encryption operation and an encryption algorithm used for the second encryption operation may be identical or different. Content encrypted according to the current example embodiment cannot be decrypted into the original data unless the number and sequence of encryption operations and the type of an algorithm used for each encryption process are all known. Accordingly, this ensures a high level of security.

Figure 14:
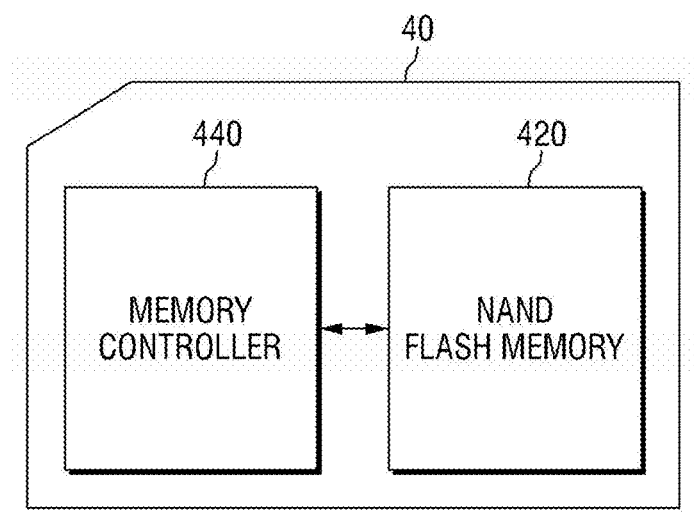
FIG. 14 is an example block diagram of a memory card to which a storage system according to some example embodiments is applied.

FIG. 14 is an example block diagram of a memory card 40 to which a storage system 30 for supporting the use of multiple keys according to some example embodiments is applied.

Referring to FIG. 14, the memory card 40 includes a NAND flash memory 420 and a memory controller 440 that controls the NAND flash memory 420.

The NAND flash memory 420 may correspond to the storage device 10 of FIGS. 1 through 13, and the memory controller 440 may correspond to the controller 20 of FIGS. 1 through 13.

The memory card 40 is applicable to a multimedia card (MMC), a security digital (SD) card, a miniSD card, a memory stick, a smartmedia card, a transflash card, or the like.

In concluding the detailed description, those skilled in the art will appreciate that many variations and modifications can be made to the example embodiments without substantially departing from the principles of the example embodiments. Therefore, the disclosed example embodiments are used in a generic and descriptive sense only and not for purposes of limitation.

What is claimed is:

1. A storage system comprising:
   a storage device including a first storage unit and a second storage unit that are recognized as a single storage device, the first storage unit configured to store a first key, and the second storage unit configured to store a second key different from the first key; and
   a controller configured to receive a key provision request signal from an external device, transmit to the storage device one of a first key-read control signal that includes information about the first storage unit and a second key-read control signal that includes information about the second storage unit based on the key provision request signal, the controller configured to receive the first key as identification information of the storage device in response to the first key-read control signal and the controller configured to receive the second key as the identification information of the storage device in response to the second key-read control signal.

2. The storage system of claim 1, wherein the key provision request signal includes information about a read target storage unit, and the controller is configured to provide the storage device with a first key-read command if the read target storage unit is the first storage unit and a second key-read command if the read target storage unit is the second storage unit.

3. The storage system of claim 1, wherein each of the first key-read control signal and the second key-read control signal include a first command signal, an address signal, and a second command signal sequentially, the first key-read control signal including identification information of the first storage unit in the address signal, and the second key-read control signal including identification information of the second storage unit in the address signal.

4. The storage system of claim 1, wherein the first key is a unique ID of the first storage unit, and the second key is a unique ID of the second storage unit.

5. The storage system of claim 1, wherein the storage device includes an internal logic configured to receive the first key from the first storage unit by inputting a key-read command to the first storage unit in response to the first key-read control signal and the internal logic configured to receive the second key from the second storage unit by inputting a key-read command to the second storage unit in response to the second key-read control signal, where the key-read command does not include address information.

6. The storage system of claim 1, wherein the storage device includes an internal logic configured to store an address of the first key in the first storage unit and an address of the second key in the second storage unit, the internal logic is configured to receive the first key from the first storage unit by inputting a read command set to the first storage unit in response to the first key-read control signal, the read command set including the stored address of the first key, and the internal logic is configured to receive the second key from the second storage unit by inputting a read command set to the second storage unit in response to the second key-read control signal, the read command set including the stored address of the second key.

7. The storage system of claim 1, wherein the storage device includes an internal logic configured to receive the address of the first key from the first storage unit by inputting a key address query command to the first storage unit in response to the first key-read control signal, the internal logic is configured to receive the first key from the first storage unit by inputting a read command set to the first storage unit, the read command set including the address of the first key, the internal logic is configured to receive the address of the second key from the second storage unit by inputting a key address query command to the second storage unit in response to the second key-read control signal, and the internal logic is configured to receive the second key from the second storage unit by inputting a read command set to the second storage unit, the read command set including the address of the second key.

8. The storage system of claim 1, wherein the storage device includes one or more additional storage units that are recognized as a single storage device together with the first storage unit and the second storage unit, and the controller is configured to output a total number of storage units included in the storage device in response to a storage unit number query request from the external device, wherein all of the additional storage units store respective keys.

9. The storage system of claim 8, wherein the storage device includes an internal logic configured to store the total number of storage units included in the storage device, and the controller is configured to transmit a storage unit number query control signal to the internal logic in response to the storage unit number query request from the external device, and the controller is configured to receive the number of storage units from the internal logic.

10. The storage system of claim 1, wherein the controller is configured to receive an invalid key registration request from the external device, the invalid key registration request including information about a key output stop target storage unit, the controller is configured to perform an invalid key registration process for the key output stop target storage unit and to transmit an invalid key notification signal to the external device if receiving the key provision request signal from the external device, the key provision request signal including information about the key output stop target storage unit.

11. The storage system of claim 1, wherein the controller is configured to perform an invalid key registration process in response to an invalid key registration request that includes information about one or more invalid keys and the controller is configured to transmit an invalid key notification signal in response to a key provision request that includes information about a storage unit storing one of the invalid keys.

* * * * *